United States Patent [19]

Needham

[11] Patent Number: 4,788,232

[45] Date of Patent: Nov. 29, 1988

[54] PIGMENT CONCENTRATES FOR RESINS

[75] Inventor: Donald G. Needham, Ramona, Okla.

[73] Assignee: Phillips Petroleum Company, Bartlesville, Okla.

[21] Appl. No.: 111,539

[22] Filed: Oct. 23, 1987

Related U.S. Application Data

[62] Division of Ser. No. 829,053, Feb. 13, 1986, Pat. No. 4,720,514, which is a division of Ser. No. 710,887, Mar. 11, 1985, Pat. No. 4,600,736.

[51] Int. Cl.$^4$ ............................ C08K 5/01; C08K 5/09
[52] U.S. Cl. ................................. 523/351; 523/333; 524/120; 524/140; 524/141; 524/143; 524/145; 524/286
[58] Field of Search ............... 523/351, 333; 524/140, 524/141, 143, 145, 286, 120

[56] References Cited

U.S. PATENT DOCUMENTS

| | | | |
|---|---|---|---|
| 3,004,056 | 10/1961 | Nunn et al. | 260/461 |
| 3,004,057 | 10/1961 | Nunn et al. | 260/461 |
| 3,170,877 | 2/1965 | Belswanger | 252/8.8 |
| 3,277,217 | 10/1966 | Nehmsmann et al. | 260/985 |
| 3,317,344 | 5/1967 | Scudder | 117/121 |
| 3,341,343 | 9/1967 | Belswanger | 106/177 |
| 3,591,412 | 7/1971 | Smit | 117/156 |
| 3,639,517 | 2/1972 | Kitchen et al. | 260/879 |
| 3,639,521 | 2/1972 | Hsieh | 260/880 |
| 3,923,707 | 12/1975 | Berg et al. | 526/339 |
| 3,930,107 | 12/1975 | Yaeda et al. | 427/393.5 |
| 3,935,329 | 1/1976 | Reilly et al. | 427/223 |
| 3,939,112 | 2/1976 | Needham | 260/33.6 |
| 4,026,933 | 5/1977 | Edwards et al. | 524/575 |
| 4,090,989 | 5/1978 | Chen | 524/140 |
| 4,091,053 | 5/1978 | Kitchen | 260/880 |
| 4,126,662 | 11/1978 | Middlebrook | 524/9 |
| 4,316,825 | 2/1982 | Wirth | 525/240 |
| 4,431,775 | 2/1984 | Maeda et al. | 525/305 |
| 4,588,794 | 5/1986 | Oda et al. | 526/169.2 |

*Primary Examiner*—Herbert J. Lilling
*Attorney, Agent, or Firm*—A. W. Umphlett

[57] ABSTRACT

Resinous pigment concentrates comprising at least one pigment and a dispersing additive of a naphthenic extender oil and/or a phosphate ester blended with a major portion of a resinous polymer containing a significant proportion of at least one polymerized conjugated diene monomer, when used for coloring resinous polymers as described, are effective in reducing such defects in finished articles as gels and surface blemishes.

16 Claims, No Drawings

PIGMENT CONCENTRATES FOR RESINS

This application is a divisional of application Ser. No. 829,053, filed Feb. 13, 1986, now U.S. Pat. No. 4,720,514, which is a divisional of application Ser. No. 710,887, filed Mar. 11, 1985, now U.S. Pat. No. 4,600,736.

This invention relates to pigment concentrates for blending in thermoplastic resin materials, and to processes for preparing colored resin compositions.

BACKGROUND OF THE INVENTION

Pigment concentrates for blending in thermoplastic resins are known. Such concentrates must be selected according to the characteristics of the resins to be colored. It is desirable to avoid defects in colored resins, particularly those which are transparent or translucent. For example, certain polymodal branched block copolymers of butadiene and styrene are disclosed in my previous U.S. Pat. No. 3,939,112 (1976). These resinous copolymers, marketed by the Phillips Petroleum Company as K-Resin ® resins, have many desirable properties, one of which is optical clarity.

It is often desired to provide coloration to articles made from such resins while still maintaining transparency, though opaque or "semi-opaque" colored articles made from various resins are also useful in many applications. In any case, a well known convenient method of providing colored thermoplastic compositions is to employ a pigment concentrate or masterbatch wherein a pigment or colorant at relatively high concentration is admixed with a polymer which is highly compatible with the thermoplastic resin to be colored. For example, polystyrene, as the polymer to prepare the pigment concentrate, does not harm the transparency of the final blend of compositions based upon such polymodal branched block copolymers, but the physical properties such as impact strength are significantly reduced. To ensure compatibility, it would be highly desirable to employ a similar polymer to prepare the pigment concentrate to be further blended or "let down" with the base polymer.

Thus, it is desirable to develop pigment concentrates comprising resinous polymers or similar resins which can be admixed with a major portion of the same, a similar or related resin without creating the problems such as defects in esthetic appearance or physical properties.

Problems have been encountered in attempting to use certain polymodal branched block copolymers in pigment concentrates for coloring simialr polymers. Primarily, gels or opaque surface blemishes are generated in the final articles. In addition, agglomerates of pigment particles which have not been well dispersed often appear and mar the appearance of the final articles. Akin to the agglomerate problem is the problem of streaking wherein the final article shows streaks of heavier or lighter coloration. Streaking is generally an undesirable feature in the final articles. These defects are particularly conspicuous and objectionable in clear colored resins, which are a significant application of K-Resin ® resins and similar polymodal copolymers.

Possible explanations for the above problems are as follows: (1) Gels are caused by the high shear conditions needed to obtain a reasonably homogeneous blend of the pigment and resin in the concentrate; (2) Pigment agglomerates result from poorly dispersed pigment which in turn might result from inadequate mixing in preparing the concentrate; and (3) Streaks are believed to result from inadequate mixing of the pigment concentrate with the virgin polymer.

The instant invention provides a means to reduce the occurrence of the above problems in producing colored articles of various resinous polymers, such as polymodal resinous copolymers or similar resins by the use of certain additives in preparing a resinous pigment concentrate.

An object of this invention is to provide a resinous pigment concentrate which can be used to produce colored resinous copolymers or similar resins without adverse effects as described above. Another object of this invention is a process for preparing such a resinous pigment concentrate. Still another object is a process for coloring resinous copolymers or similar resins by admixing a base resin with the inventive resinous pigment concentrate. A further object of this invention is a process for producing articles of resinous copolymers or similar resins colored with the inventive pigment concentrate.

Other objects, advantages and features of the instant invention will be apparent from the following disclosure and the appended claims.

SUMMARY OF THE INVENTION

In accordance with this invention, it has been found that by preparing a resinous pigment concentrate by admixing a liquid dispersing additive with a resinous copolymer containing significant amounts of a polymerized conjugated diene monomer, preferably in the range of from about 5 to about 40 weight percent, and a pigment, the problems encountered in using such a resinous pigment concentrate can be significantly reduced. For the purposes of this application "resinous" is taken to mean non-elastomeric.

Materials useful as said liquid dispersing additives are:

(A) Naphthenic type petroleum oils, also known as naphthenic extender oils because of their longtime use in the rubber compounding art as rubber extenders; and (B) Partial esters of phosphoric acid.

These dispersing additives can be used singly or in combination in a single pigment concentrate, and pigment concentrates containing one or both types of additives can be used in combination in colored resins.

In an embodiment, a pigment concentrate comprises a resin as described above, pigment, and a partial ester of phosphoric acid as the dispersing additive. In another embodiment, the dispersing additive further comprises a naphthenic extender oil. In a preferred embodiment, the concentrate comprises the resin, at least about 0.01 weight percent of pigment, and about 0.5 to less than about 2 weight percent naphthenic extender oil, based on the total pigment concentrate. In still another embodiment, the concentrate comprises the resin, at least about 2 weight percent of pigment, and about 2 to about 12 weight percent naphthenic extender oil.

Generally, it is most convenient and economical to use only one type of such additives. The choice of the preferred additive may be influenced by factors comprising additive price, compatibility with pigments, and requirements imposed by governmental agencies such as the Food and Drug Administration (FDA). For example, the esters are presently preferred for many applications because their use has been approved by the FDA.

While the pigment concentrate of this invention has been developed for use with the K-Resin® resins disclosed in e.g., U.S. Pat. Nos. 3,939,112 and 3,639,517 assigned to Phillips Petroleum Co., similar concentrates can be prepared for use with other resinous, linear or branched, block, butadiene/styrene copolymers, by blending pigments with a portion of the parent resins and a dispersing additive as disclosed herein. This invention is generally applicable to resinous copolymers which contain polymerized conjugated diene monomers in proportions in the range of from about 5 to about 40 weight percent, preferably from about 10 to about 30 weight percent based on the total resin composition. Pigment concentrates of this invention can also be used for coloring other resinous polymers such as polystyrene, polypropylene, and also for coloring rubbery polymers such as butadiene, butadiene-styrene copolymers and the like.

DETAILED DESCRIPTION OF THE INVENTION

The resinous pigment concentrate of this invention can be prepared by first adding an effective amount of a dispersing additive comprising a naphthenic oil, a partial ester of phosphoric acid, or a mixture thereof, to a suitable quantity of a suitable resin, then adding a suitable quantity of pigment, all under intensive mixing conditions. An effective amount of the dispersing additive for the preparation of the resinous pigment concentrate is that amount which will produce a pigment concentrate which is useful in normal concentrations for coloring resins within the scope of this invention, at the same time reducing the formation of gels, blemishes or the like in finished articles produced from the resultant colored resin. Preferably, the dispersing additive is included in the concentrate in an amount effective to essentially eliminate such gels and blemishes when the concentrate is added to resins in normal amounts. By using such a resinous pigment concentrate, resinous copolymers or similar resins can thus be colored by dispersing pigment completely and homogeneously through the resin composition without reducing such important properties as impact strength. The use of an effective amount of the dispersing additive also allows the use of such a resinous pigment concentrate without significant problems such as gel formation or blemishes in finished articles produced from the resultant colored resin, whether clear, semi-opaque, or opaque.

While not wishing to be bound by such theory, it is believed that the principal problem resolved by this invention, i.e., the formation of gels in the resinous pigment concentrate and final resin compositions, is due to the sensitivity of the polymers to thermal or oxidative degradation under relatively high shear mixing conditions due to the presence of residual olefinic unsaturation derived from the polymerized conjugated diene monomers. Thus, the problems would be expected to increase in severity as the conjugated diene content of the resin increases.

Use of Resinous Pigment Concentrate

The resinous pigment concentrate of the instant invention is employed in the conventional manner known in the art. For example, the resinous pigment concentrate pellets and virgin resin pellets can be mixed in a drum tumbler mixing device at the desired ratios and the mixture then charged to an extruder for fluxing of the blend to form an essentially homogenous melt of colored resin composition for further processing as in injection molding or blow molding, or in forming colored pellets for storage until ready for use in injection molding or blow molding operations. The pigment concentrate can be used as an amount in the range of from about 0.5 weight percent to about 25 weight percent of the final colored resin composition, depending upon the color strength of the concentrate, the intensity of color desired in the resin composition, and whether the colored resin composition is to be clear, translucent, or opaque.

Suitable Additives

As discussed earlier, the amount of dispersing additive required in the resinous pigment concentrate is that which is effective in reducing the formation of gels, blemishes and the like when finished articles are produced from resin compositions colored with suitable quantities of said pigment concentrate, at the same time avoiding significant degradation of physical properties. Enough dispersing additive should be present to disperse the pigment effectively in the concentrate, and, later, the resin to be colored, without any degradation of the polymer; however, excesses should be avoided, as this may prevent the development of enough internal shear on mixing for proper dispersion of the pigment.

The amount of the partial ester of phosphoric acid, or mixtures thereof with naphthenic oil, employed in preparing the resinous pigment concentrate according to this invention can be broadly from about 0.5 to about 12 percent by weight, based on the total resinous pigment concentrate composition.

The largest amounts of pigment are used in pigment concentrates which are to be used in preparing colored opaque or semi-opaque resins, where gels and some blemishes are less noticeable in finished products. For such pigment concentrates, the amount of dispersing additive used can be in the range of from about 4 to about 12 weight percent of the concentrate, or preferably in the range of from about 5 to about 10 weight percent, depending upon the nature of the pigments and the base resin which the concentrate is to be used to color. Pigment concentrates for use in the preferred clear resins can contain dispersing additives as in the range of from about 0.5 to about 10 weight percent, preferably in the range of about 1 to about 6 weight percent, or more preferably, in the range of about 2 to about 4 weight percent based on the total pigment concentrate.

Selections of values from within these ranges will depend upon such factors as the characteristics of the pigments, and the resins to be used in both the pigment concentrate and the colored composition.

A preferred pigment concentrate comprises as a dispersing additive a naphthenic oil alone in an amount in the range of from about 0.5 to less than about 2.0 weight percent of the pigment concentrate, which contains at least about 0.1 weight percent pigment. Another preferred concentrate comprises pigment as at least about 2 weight percent, and about 2 to about 12 weight percent naphthenic oil.

Naphthenic Extender Oils

Naphthenic extender oils useful in accordance with this invention comprise naphthenes or paraffins and some aromatic hydrocarbons. The naphthenic extender oils such as conventionally employed in rubber formulations can be used for the practice of this invention.

These oils have a viscosity in the range of about 100 to about 5,000 SUS at 100° F. In a presently preferred embodiment, such oils contain about 40 weight percent naphthenics, about 45 weight percent paraffins, and about 15 weight percent aromatics. A particular preferred naphthenic extender oil is ASTM D-2226 Type 103, having a viscosity of 760 SUS at 100° F., a flash point of 410° F. and an aniline point of 179° F., marketed as Sunthene ®380 by the Sun Oil Co.

Naphthenic extender oils are preferred as the liquid dispersing additives of certain embodiment of this invention because such oils are compatible with the much larger amounts of naphthenic oils which can be added to certain polymodal resins in amounts effective to improve impact strength in accordance with my previous U.S. Pat. No. 3,939,112; thus when the resinous pigment concentrate is blended into the base resin, the naphthenic oil in the pigment concentrate can enhance the improvement in impact strength of articles formed from the resin. Also, such naphthenic oils are readily available at reasonable cost in a wide range of viscosities which are effective for practicing this invention.

While a naphthenic extender oil can be added to such resins as at least about 10 weight percent of the resin composition to achieve a significant increase in impact strength, such oils are generally added to resins as only about 0.5 to about 10 weight percent to form the pigment concentrates of this invention. Thus, for example, when such pigment concentrates are added to resin compositions as less than about 20 weight percent, the extender oil included as part of said pigment concentrate will constitute less than 2 weight percent of said resin composition.

Phosphate Esters

Alternatively, partial esters of phosphoric acid, chemically described as free acids of complex organic phosphate esters, can be used as the liquid additive. While presently more expensive than the naphthenic oils, these materials are preferred for certain applications involving food packaging which require Food and Drug Administration (FDA) approval of materials. Exemplary additives are marketed by GAF, Inc. as antistatic agents under the tradenames GAFSTAT-®AD-510, AE-6109, AS-610 and AS-710. Such products have significant lubricating and dispersing properties which are believed to make them effective in formulating the pigment concentrates of this invention.

The product used in preparing pigment concentrates in Example I herein was GAFSTAT®AE-610, which is the reaction product of $P_2O_5$ with the condensation product of ethylene oxide (10 mole parts) and nonylphenol (1 mole part) at a ratio of 217 moles of the condensation product per mole of $P_2O_5$. Many such partial esters of phosphoric acid can be employed as additives for preparing pigment concentrates for use with various resins as disclosed herein. Such phosphate esters are disclosed in U.S. Pat. No. 3,341,343 (1967) assigned on its face to General Aniline & Film Corp. of New York City.

Additives useful in this invention can be phosphate esters selected from the group consisting of mono-, diesters, triesters and mixtures thereof of phosphoric acid with a nonionic surfactant condensation product of an organic compound containing at least 6 carbon atoms and containing a reactive hydrogen with at least 1 mole of alkylene oxide.

The phosphate esters derived from nonionic surfactants (surface active agents) are useful in the preparation of dispersions of compositions of matter of hydrophobic polymers. Phosphate esters have a number of advantages in this particular application. Their hydrophobic and hydrophilic nature may be varied over a wide range by the selection of nonionic surfactants having varying amounts of alkylene oxides. This is a particular advantage when a dispersion of a pigment having a specific hydrophobic-hydrophilic balance is desired. The compatibility of the mono and disubstituted esters may be further modified by conversion to their salts. This is a distinct advantage in the formulation of these compositions.

Phosphate esters useful in attaining the objects of this invention are selected from the group corresponding to the general formula:

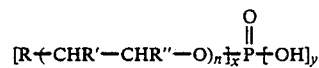

wherein R is a residue of an alkyl, alkaryl or aryl compound having at least 6 carbon atoms and a reactive hydrogen, e.g., the residue of an alkylphenol, aliphatic alcohol, fatty acid, fatty acid amide, fatty amine, rosin amine, alkyl sulfonamide, alkaryl sulfonamide, alkyl mercaptan or alkylaryl mercaptan, R' is hydrogen, an alkyl radical of from 1 to 10 carbon atoms or an aryl radical, R" is hydrogen, an alkyl radical of 1 to 10 carbon atoms or an aryl radical, n represents an integer of from 1 to 150, x represents an integer of 1 to 3, y represents an integer of from 0 to 2, and the sum of the integers of x and y is 3.

The phosphate esters of nonionic surfactants useful in attaining the objects of this invention which are herein contemplated are obtained from precursor nonionic surfactants selected from the group consisting of polyoxyalkylene ethers of organic compounds containing at least 6 carbon atoms and having a reactive hydrogen atom and condensed with at least 1 mole of alkylene oxide. The preferred number of alkylene oxide molecules reacted with the reactive hydrogen compound may vary from 1 to 150 moles and the number of carbon atoms in the alkylene oxide from 1 to 12.

In addition to the above described nonionic surfactants, polyoxyalkylene derivatives of organic mercapto compounds such as the products described in U.S. Pat. No. 2,205,021 (the polyoxyalkylene derivatives of mercapto compounds such as dodecyl mercaptan, oleyl mercaptan, cetyl mercaptan, benzomercaptan, thiophenols or thionaphthols) may be used. Other useful polyalkylene derivatives include the carboxylic acid amides described in U.S. Pat. No. 2,085,706 and the sulfonamides described in U.S. Pat. No. 2,002,613. Polyalkylene derivatives of aliphatic organic compounds such as higher fatty acids and hydroxy fatty acids may also be used.

Phosphate esters derived from the above nonionic surfactants may be prepared by a variety of methods. Numerous methods for the preparation of these esters may be found in many patents and other publications. Various phosphation agents such as phosphorus pentoxide, phosphorus oxychloride, orthophosphoric acid, polyphosphoric acid or the like may also be used.

Generally, it is preferred to use the method as disclosed and claimed in U.S. Pat. No. 3,004,056 by Nunn and Hesse and in U.S. Pat. No. 3,004,057 by Nunn.

Briefly, this method involves reaction of 1 mole of phosphorus pentoxide ($P_2O_5$) with from 2 to 4.5 moles of nonionic surfactant under substantially anhydrous conditions at temperatures below 110° C. The method gives mixtures of mono- and di-substituted phosphate esters.

Another useful method for producing mono- and di-substituted phosphate esters is that disclosed in U.S. Pat. No. 3,277,217. This method involves oxidation of mono- and di-substituted phosphites to the corresponding phosphates. The method may be used to produce monosubstituted, disubstituted, trisubstituted or mixtures of these substituted phosphate esters in higher states of purity as well as mixtures of these esters in which the concentration of each of the types of esters may be maintained within close limits.

The above described mono and disubstituted phosphate esters may be used in this invention in their free and unneutralized form or in the form of partially or completely neutralized salts containing as cations, alkali metals, alkaline earth metals, other metals, ammonia or organic amines. It is to be understood that such salts are to be considered as the equivalents of the phosphate esters in their free form. As examples of suitable cations for neutralizing the mono and disubstituted phosphate esters, there may be mentioned sodium, potassium, lithium, calcium, strontium, barium, magnesium, iron, tin, cadmium, aluminum, antimony, chromium, manganese, mercury, nickel, ammonia or organic amines such as the mono, di, and trimethylamines, ethylamines, propylamines, butylamines, hexylamines, octylamines, decylamines, laurylamines, stearylamines, ethanolamines, propanolamines, butanolamines, hexanolamines, cyclohexylamines, phenylamines, pyridine, morpholine or the like.

Suitable Pigments

The pigment concentrates of this invention can be prepared with any of the wide variety of pigments and colorants that have been proven useful and effective for use with resinous polymers containing polymerized conjugated diene monomers, and with K-Resin ® resins and similar polymodal, resinous, linear or branched, block, butadiene/styrene copolymers. Pigments are currently available to produce a broad spectrum of transparent, opaque, fluorescent, pearlescent, or metallic colors. The pigment should be thermally stable at temperatures at least as high as encountered in blending the pigment concentrate. Generally, suitable pigments include many inorganic compounds, organic compounds and metal flakes, as long as said pigment is thermally stable up to at least about 400° F. (204° C.). Thermal instability would result in compositions which would be off-color and not true to the desired coloration. Thermal stability can be tested by heating a sample of the pigment, wrapped in aluminum foil to exclude air as much as possible, in a compression mold at say 400° F. (204° C.) for 30 minutes and then examining the sample for any color change. A significant change in color is indicative of thermal instability.

Typical classes of inorganic pigments include iron oxides, cadmium sulfides, molybdates and chromates. Typical classes of organic pigments include anthroquinones, quinacridones, phthalocyanines, perylenes, and isoindolinones. Typical metallic flakes include copper, aluminum and brass.

Suitable Resins

The resins to which this invention applies are resinous copolymers containing significant amounts of polymerized conjugated diene monomers, i.e., with a diene content in the range of from about 5 to about 40 percent by weight based upon the total resin composition, or preferably in the range of from about 10 to about 30 weight percent.

The resins to which this invention applies further comprise the resins marketed as K-Resin ® resins, characterized as the linear or branched block copolymers of butadiene and styrene disclosed in, e.g., U.S. Pat. No. 3,639,517 to Kitchen et al. The resins are described therein to have strength, clarity, processability and environmental durability. For many applications of these resins, their impact strength is an important feature.

A resin useful in accordance with this invention has the generic formula $(A-B)_xY$, wherein A is essentially a block of polymerized monovinyl-substituted aromatic monomers of 8 to about 16 carbon atoms; B is essentially a polymerized conjugated alkadiene block, the alkadiene having 4 to about 12 carbon atoms; Y is an atom or group of atoms derived from a polyfunctional coupling agent; and x represents the number of functional groups of said polyfunctional coupling agent.

The resins useful in accordance with this invention can be branched. That means more than two blocks A-B are connected via one radical of the polyfunctional coupling agent.

The preferred weight distribution of A and B is such that the polymer comprises about 70 to about 95 weight percent, more preferably about 75 to about 85 weight percent of the polymerized monovinyl-substituted aromatic hydrocarbon and about 30 to about 5 weight percent, more preferably about 25 to about 15 weight percent, of the polymerized conjugated alkadiene monomer.

Presently preferred is the polymodal resin obtained by copolymerizing butadiene and styrene, coupled by an epoxidized linseed oil having an average of about 5 functional groups per molecule. Another preferred polymer is derived from isoprene and styrene as comonomers. The polymer blocks A-B preferably demonstrate a plurality of nodes on a gel permeation chromatograph before coupling. Thus, the resulting copolymer has a polymodal molecular weight distribution. The preferred resins can additionally be defined as having a melt flow of about 0.5 to about 20.0 as determined by ASTM D-1238-65T, Condition G, and when formed into an article as demonstrating a haze transmittance in the range of about 0 to about 20 percent as determined by ASTM D-1003-61, Procedure A, a falling ball impact strength value of at least 1.0 ft.-lbs. and environmental stress cracking resistance value of at least 100 days at 0 percent failure.

Polymers useful in the composition of this invention, as well as the methods to make same, are disclosed in more detail in U.S. Pat. No. 3,639,517, which is hereby included in this disclosure by reference. One presently preferred polymer is a polymodal, branched butadiene/styrene block copolymer comprising about 24 weight percent butadiene and about 76 weight percent styrene. The branches of this radial block copolymer have a bimodal molecular weight distribution in the styrene blocks.

Other versions of K-Resin® resins, to which this invention is equally applicable, are disclosed in U.S. Pat. Nos. 4,091,053; 4,051,197; 4,080,407; 4,120,915; 4,104,326; 4,308,364, and 4,309,517, all assigned to Phillips Petroleum Company.

As previously disclosed, this invention is not limited to resins described as K-Resin® resins in the U.S. patents cited above, but can be applied to any resinous linear or branched block copolymer comprising significant proportions of a conjugated alkadiene, preferably in conjunction with a vinyl arene. The use of the additives disclosed herein to prepare resinous pigment concentrates comprising portions of such copolymers can be expected to be effective in reducing problems in the finished colored polymer compositions which can be attributed to instability in the alkadiene phase of such polymers.

Blending Conditions for Resin Pigment Concentrate Preparation

The resinous pigment concentrate of this invention can be prepared in conventional thermoplastic resin processing equipment. The typical procedure involves first adding the naphthenic oil or partial ester of phosphoric acid to the resin pellets, followed then by the pigment, all under intensive mixing conditions. A compounding extruder can be conveniently employed as the mixing apparatus. The temperature during the mixing operation should not exceed about 450° F. (232° C.) to avoid degradation of the resin or other components of the pigment concentrate. However, mixing can generally be done effectively at about 400° F. (204° C.).

The polymer compositions comprising the pigment concentrates of this invention can also contain small amounts of conventionally employed additives such as stabilizers, antioxidants, antiblocking agents, and the like.

The invention and its advantages will be more fully understood from the following example:

EXAMPLE I

Several K-Resin® resin pigment concentrate runs were made which compared the effect of dispersing additives of this invention (Runs B and C) against a control run which employed no additive (Run D) and another control run which employed a white mineral oil (Run A) as the additive.

Each run employed 0.37% by weight of a green pigment which was a blend of carbon black (0.05% by weight), Phthalocyanine Green (0.145% by weight) and azo yellow (0.175% by weight). All the above percent by weight figures are based on the total resin pigment concentrate composition. Runs A, B, and C each used 2 percent by weight of the additive while run D used no additive. The balance of each pigment concentrate was made up of K-Resin® resin (KR-05). See Example I of U.S. Pat. No. 3,939,112 for a general description of this type of polymer. K-Resin® resin KR-05 is a selected grade of K-Resin® resin KR-03 wherein the selection is based on a very low "fish eye" (gels) content. The KR-05 resin is particularly well suited for applications where a high degree of clarity is desired. However, this invention is not limited to this particular type and grade of polymer as has been noted earlier. The partial ester of phosphoric acid employed in Run B has been previously described (GAFSTAT®AE-610). The naphthenic oil used in Run C was Sunthene 380® (Sun Oil Co.), described earlier herein. The white mineral oil used in Run A was Sontex 350 from Marathon Morco Co. This oil is a petroleum derived, highly paraffinic oil.

Each of the pigment concentrates was made in a pelletizing extruder at about 400° F. (204° C.) by adding the dispersing additive, then the pigment, to the K-Resin® resin. Each pigment concentrate was blended with virgin resin at a 24/1 (virgin/concentrate) let down ratio. Each blend was then employed to form molded green bottles. The bottles were examined for gels, agglomerates and color streaking. The results obtained in these runs are shown in Table I.

TABLE I

| Property | Comment/Rating[a] | | | |
|---|---|---|---|---|
| | A | B (Invention) | C (Invention) | D (Control) |
| Agglomerates | Few/3 | Few/2 | Few/1 | Many/4 |
| Streaks | Several/3 | Few/1 | Few/2 | Many/4 |
| Gels | Several/3 | Few/2 | Few/1 | Many/4 |
| Overall Rank | 3 | 2 | 1 | 4 |

[a]Qualitative visual inspection rating.

The results shown in Table I show that the addition of the naphthenic oil (Run C) and the partial ester of phosphoric acid (Run B) in the K-Resin® resin pigment concentrate provided a significant reduction in the problems of gels, pigment agglomerates, and color streaking in the final blow molded bottles. Surprisingly, the use of white mineral oil (Run A) in preparing the K-Resin® resin pigment concentrate provided only a slight improvement over the control run D which employed no additive, thus illustrating the advantages of the invention additives used in Runs B and C.

While this invention has been described in detail for purposes of illustration, it is not to be construed as limited thereby, but is intended to cover all changes and modifications within the spirit and scope thereof.

I claim:

1. A resinous pigment concentrate comprising a major portion of a resinous polymer containing at least one polymerized conjugated diene monomer in proportions in the range of from about 5 to about 40 weight percent, based upon the total resinous polymer; a minor portion of at least one pigment, and a dispersing additive consisting essentially of a naphthenic extender oil.

2. A resinous pigment concentrate in accordance with claim 1 wherein said naphthenic extender oil is present in an amount in the range of from about 0.5 to less than 2 weight percent of said pigment concentrate.

3. A resinous pigment concentrate in accordance with claim 2 wherein said pigment is present as at least about 0.01 weight percent of the total pigment concentrate.

4. A resinous pigment concentrate in accordance with claim 1 wherein said dispersing additive is present as an amount in the range of from about 2 to about 12 weight percent of said concentrate, and said pigment is present as at least about 2 weight percent of said concentrate.

5. A resinous pigment concentrate in accordance with claim 1 wherein said dispersing additive is present in an amount effective to prevent the formation of gels or blemishes in articles produced of resins colored with said pigment concentrate.

6. A resinous pigment concentrate in accordance with claim 1 wherein said naphthenic extender oil comprises naphthenes, paraffins, aromatic hydrocarbons and mixtures thereof, and has a viscosity in the range of from about 100 to about 5000 SUS at 100° F.

7. A resinous pigment concentrate in accordance with claim 1, wherein said naphthenic extender oil consists essentially of from about 30 to 50 weight percent naphthenics, from about 35 to 55 weight percent paraffins, and from about 5 to about 25 weight percent aromatics, the total being 100 weight percent.

8. A resinous pigment concentrate in accordance with claim 1 wherein said naphthenic extender oil is ASTM D-2226 Type 103.

9. A resinous pigment concentrate in accordance with claim 1 wherein said pigment is selected from the group consisting of metals and organic and inorganic compounds which are thermally stable at temperatures at least as high as the maximum mixing temperature of said resinous pigment concentrate.

10. A resinous pigment concentrate prepared by a process comprising the following steps:
   (a) under intensive mixing conditions, blending with a major portion of a resinous copolymer containing at least one polymerized conjugated diene monomer in proportions in the range of from about 5 to about 40 weight percent, based upon the total resinous copolymer, an amount of a naphthenic extender oil as a dispersing additive effective to reduce gel formation or surface blemishes in finished articles made of a polymer which is colored with said resinous pigment concentrate; and
   (b) adding at least one pigment to said major portion of resinous polymer and said minor portion of naphthenic oil, as at least about 0.1 weight percent of said resinous pigment concentrate.

11. A process of preparing colored resinous copolymers containing at least one polymerized conjugated diene monomer in proportions in the range of from about 5 to about 40 weight percent, based upon the total resinous copolymer, which comprises the blending of said resinous copolymer under intensive mixing conditions with a resinous pigment concentrate comprising a major portion of a resinous pigment concentrate comprising a major portion of a resinous copolymer containing at least one polymerized conjugated diene monomer in proportions in the range of from about 5 to about 40 weight percent of said copolymer, a minor portion of at least one pigment, and a dispersing additive consisting essentially of a naphthenic oil.

12. Colored resins prepared in accordance with claim 11.

13. Articles of manufacture prepared from colored resins prepared in accordance with claim 11.

14. Articles of manufacture in accordance with claim 12 prepared in the form of films, sheets, or blow moldings.

15. A resinous pigment concentrate prepared in accordance with claim 10 wherein said resinous copolymer is a polymodal linear or branched block copolymer having the generic formula $(A-B)_xY$, wherein A is essentially a block of polymerized monovinyl-substituted aromatic monomers having from 8 to about 16 carbon atoms; B is essentially a polymerized conjugated alkadiene block, the alkadiene having from 4 to about 12 carbon atoms; Y is an atom or group of atoms derived from a polyfunctional coupling agent; and x represents the number of functional groups of said polyfunctional coupling agent.

16. A process in accordance with claim 11 wherein said copolymers have the generic formula $(A-B)_xY$, wherein A is essentially a block of polymerized monovinyl-substituted aromatic monomers having from 8 to about 16 carbon atoms; B is essentially a polymerized conjugated alkadiene block, the alkadiene having from 4 to about 12 carbon atoms; Y is an atom or group of atoms derived from a polyfunctional coupling agent; and x represents the number of functional groups of said polyfunctional coupling agent.

* * * * *